US00RE39718E

(19) United States
(12) Reissued Patent
Mayne

(10) Patent Number: US RE39,718 E
(45) Date of Reissued Patent: Jul. 10, 2007

(54) CONTAINER AND DETACHABLE BOTTLE

(76) Inventor: Geoffrey Robert Mayne, P O Box 60414, Titirangi, Auckland (NZ)

(21) Appl. No.: 29/222,670

(22) Filed: Jan. 28, 2005

Related U.S. Patent Documents

Reissue of:
(64) Patent No.: Des. 494,069
Issued: Aug. 10, 2004
Appl. No.: 29/172,733
Filed: Dec. 17, 2002

(30) Foreign Application Priority Data

Jul. 19, 2002 (NZ) ..... 402728

(51) LOC (8) Cl. ..... 09-03
(52) U.S. Cl. ..... D9/528
(58) Field of Classification Search ..... D9/341, D9/499, 523, 572, 516–517, 526–528, 530–531, D9/573–575; 206/527, 815; 215/40, 400, 215/382–384, 398; 220/200, 260, 288, 890, 220/560.04, 769, 771
See application file for complete search history.

(56) References Cited

U.S. PATENT DOCUMENTS

D229,483 S * 12/1973 Cutler ..... D9/528
D287,226 S * 12/1986 Lyons ..... D9/520
D302,523 S * 8/1989 Suhajda ..... D9/528
D305,451 S * 1/1990 Rosenbaum ..... D23/225
D315,497 S * 3/1991 Kamerichs et al. ..... D23/211.1
D345,303 S * 3/1994 Sykes ..... D9/528
D380,148 S * 6/1997 Hauf et al. ..... D9/528
D434,666 S * 12/2000 Celaya ..... D9/528

* cited by examiner

*Primary Examiner*—Daniel Bui
(74) *Attorney, Agent, or Firm*—Colin P. Abrahams

(57) CLAIM

The ornamental design for a container and detachable bottle, as shown.

DESCRIPTION

FIG. 1 is a front view of the container and detachable bottle of my new design;
FIG. 2 is a right side perspective view of the container and detachable bottle shown in FIG. 1, viewed from above;
FIG. 3 is a left side perspective view of the container and detachable bottle shown in FIG. 1;
FIG. 4 is a top view of the container and detachable bottle shown in FIG. 1; and,
FIG. 5 is a side view of the container and detachable bottle shown in FIG. 1.

1 Claim, 2 Drawing Sheets

Figure 1:
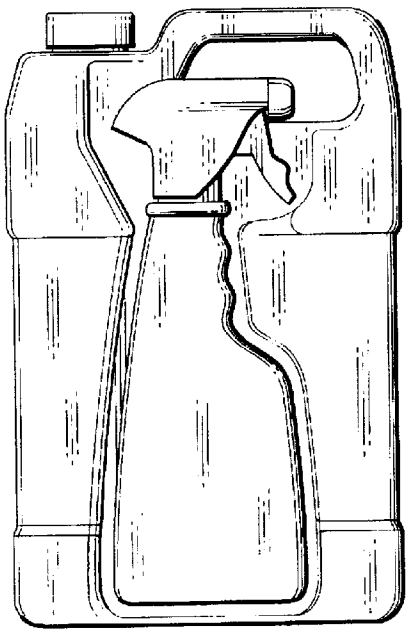
Figure 4:
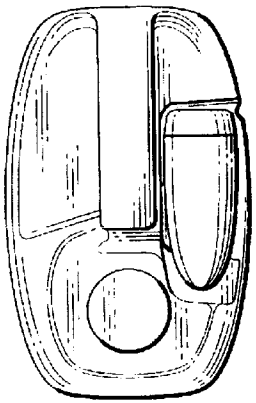
Figure 5:
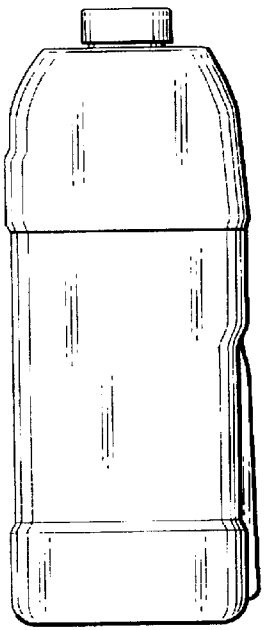
Figure 2:
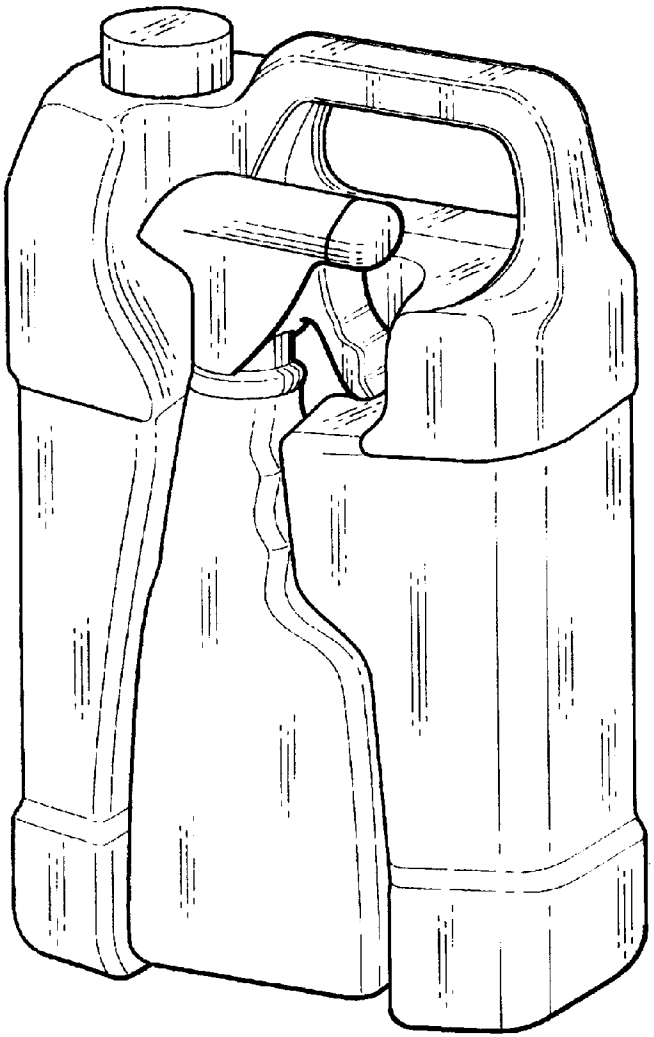
Figure 3:
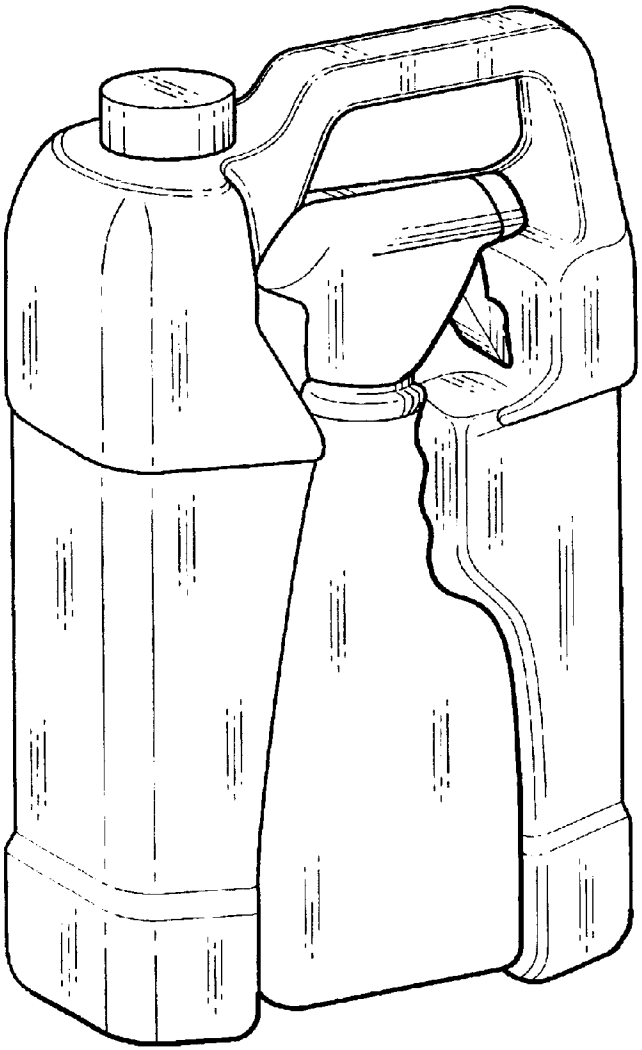

Matter enclosed in heavy brackets [ ] appears in the original patent, but forms no part of this reissue; matter printed in italics indicates the additions made by reissue.